United States Patent [19]
Kebo

[11] Patent Number: 5,587,837
[45] Date of Patent: Dec. 24, 1996

[54] BINOCULAR EYEPIECE WITH EXTENDED EYE RELIEF

[75] Inventor: Reynold S. Kebo, Los Angeles, Calif.

[73] Assignee: Hughes Electronics, Los Angeles, Calif.

[21] Appl. No.: 28,516

[22] Filed: Mar. 9, 1993

[51] Int. Cl.⁶ .............................. G02B 25/00; G02B 9/60; G02B 9/62
[52] U.S. Cl. .................. 359/643; 359/761; 359/770
[58] Field of Search .................................. 359/643, 761, 359/770

[56] References Cited

U.S. PATENT DOCUMENTS

| | | | |
|---|---|---|---|
| 3,867,018 | 2/1975 | Shoemaker | 359/643 |
| 4,316,653 | 2/1982 | Shimizu | 359/770 |
| 4,322,135 | 3/1982 | Freeman | 359/643 |
| 4,747,675 | 5/1988 | Nagler | 359/643 |

OTHER PUBLICATIONS

Pande, R. C.; "On the Design of Biocular Magnifier for Display Systems"; J. Opt. (India) vol. 7, No. 2; Apr.–Jun. 1978; pp. 42–45.

*Primary Examiner*—Scott J. Sugarman
*Attorney, Agent, or Firm*—Michael W. Sales; Wanda K. Denson-Low

[57] ABSTRACT

A binocular optical system has a pair of six lens optical systems. Each system includes one lens (12) defining an optical axis and the remaining lenses (14, 16, 18, 20, 22) centered on the axis. The lens systems (12, 14, 16, 18, 20, 22) collimate the energy passing through them onto an exit pupil (24) positioned a desired eye relief distance (30) away from the last lens (22).

12 Claims, 2 Drawing Sheets

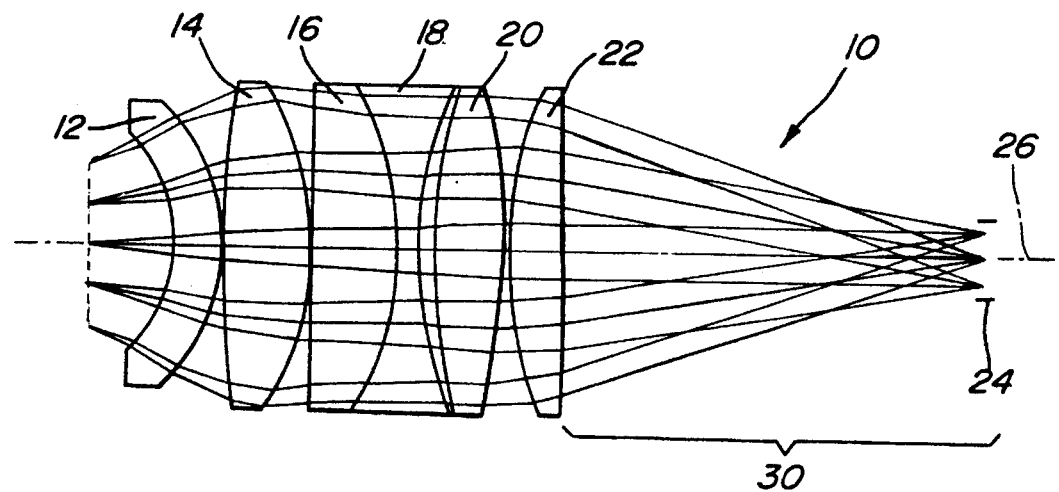
Fig-1.
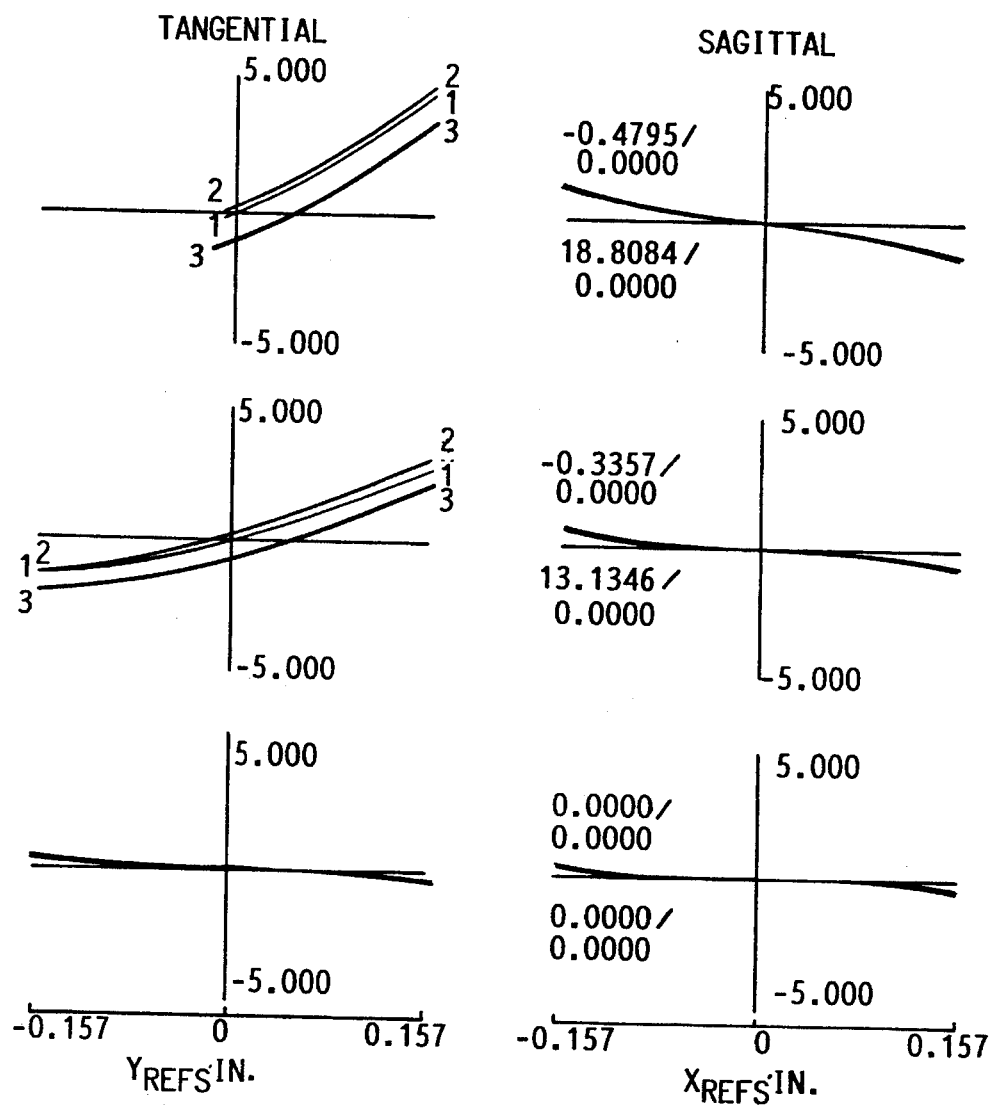
Fig-2a. Fig-2b.

BINOCULAR EYEPIECE WITH EXTENDED EYE RELIEF

BACKGROUND OF THE INVENTION

1. Technical Field

The present invention relates to an optical system and, more particularly, to a binocular eyepiece with extended eye relief.

2. Discussion

Optical systems utilized in helicopters, tanks or Bradley vehicles include binocular eyepieces which require the viewer to maintain his eyes at the exit pupil which is in close proximity to the eyepiece lenses. Thus, the viewer is positioned relatively close to the telescope eyepiece with his eyes almost touching the eyepiece end.

In different types of combat engagement, it is necessary to wear protective masks which protect the user from various environmental hazards. A viewer, with his mask in position, when looking through the current telescope eyepieces, is further away from the telescope exit pupil and is unable to clearly see the entire viewed scene. Thus, the eye relief distance (exit pupil position) is unsatisfactory when the viewer is wearing a protective mask.

Current types of binocular eyepieces used in the above vehicles, while having relatively short eye relief, have several disadvantages. These eyepieces have a relatively short eye relief distance of about less than 1½ inches. Also, the eyepieces have a focal length about equal to the eye relief distance. One example is U.S. Pat. No. 3,384,434. Further, these eyepieces have large amounts of lateral chromatic aberrations. These systems exhibit coma, axial chromatic aberration, as well as spherical aberration and distortion.

Thus, there is a need in the art to provide a binocular eyepiece which has increased eye relief distance and which has improved axial and lateral chromatic aberration correction and better distortion characteristics.

SUMMARY OF THE INVENTION

According to the teachings of the present invention, an optical system, in the form of a binocular eyepiece, provides a longer eye relief distance. The present invention provides an eye relief distance approximately 80% longer than present designs. The present invention provides a binocular eyepiece with excellent primary and secondary axial chromatic aberration correction over the entire exit pupil. Also, spherical aberration is corrected as well as coma and lateral chromatic aberration is reduced.

The present invention provides a circular field of view coverage of about 38°. The focal length of the system is about 1.46 inches and eye relief distance is 2.5 inches. Further, the invention has a small Petzval curvature sum and is a substantially flat field design.

In the preferred embodiment, the binocular eyepiece includes a pair of six lens systems. The primary lenses are negative power concave/convex lenses defining an optical axis. The secondary and tertiary lenses are positive power biconvex lenses centered with respect to the optical axis. The quarternary lenses are negative power biconcave lenses centered with respect to the optical axis. The quinary lenses as well as the sextary lenses are positive power, while the quinary lenses are biconvex and the sextary convex planar. Both the quinary and sextary lenses are centered with respect to the optical axis. The lenses work to collimate the energy passing through the optical systems through an exit pupil positioned a desired eye relief distance away from the sextary lenses. Thus, at the desired position of the exit pupil a desired increased eye relief distance is provided.

BRIEF DESCRIPTION OF THE DRAWINGS

The various advantages of the present invention will become apparent to those skilled in the art after a study of the following specification and by reference to the drawings in which:

FIG. 1 is a schematic view of a binocular eyepiece optical system in accordance with the present invention.

FIGS. 2a and 2b are a schematic view of H-tanU curves of the optical system of FIG. 1.

DETAILED DESCRIPTION OF THE PREFERRED EMBODIMENT

Figure 3:
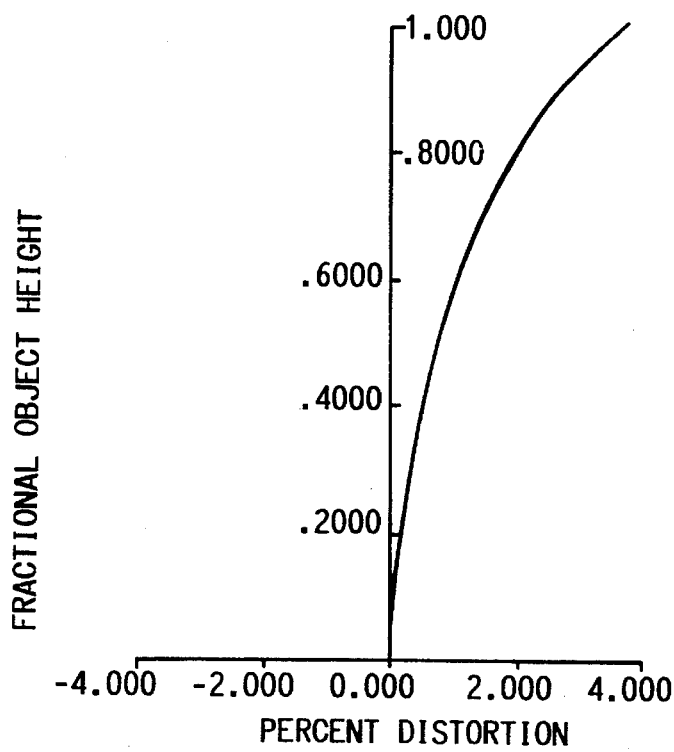
FIG. 3 is a graph of the percent distortion of the present invention.

Turning to FIG. 1, a six lens optical system is illustrated and designated with the reference numeral 10. The optical system 10 relates to a binocular eyepiece and thus includes a pair of the six lens optical systems. The system 10 includes a pair of primary lenses 12, which are negative power lenses, positioned adjacent to secondary lenses 14, which are positive power lenses. Tertiary lenses 16 are positioned adjacent the secondary lenses and have a positive power. The quartenary lenses 18 are positioned adjacent the tertiary lenses 16 and have a negative power. The quinary lenses 20 are positioned adjacent the quartenary lenses 18 and have a positive power. Finally, the sextary lenses 22 are positioned adjacent to the quinary lenses 20 and have a positive power. The six lens configuration collimates the light energy passing therethrough an exit pupil 24, which is usually at the viewer's eyes.

The lenses will be defined in the singular with the explanation being the same for each pair of six lens systems. The primary lens 12 defines an optical axis 26, which runs through the vertex of the lens. Generally, the primary lens is a concave/convex lens formed from a material providing a high index of refraction. The primary lens 12 has a predetermined radius of curvature on the concave front surface of the lens and a predetermined radius of curvature on the concave or back surface of the lens. Also, the primary lens 12 has a predetermined thickness at the vertex and predetermined aperture sizes on the concave front and convex back surfaces.

The secondary lens 14 is centered with respect to the optical axis 26. Generally, the secondary lens is a biconvex lens formed from a material providing a high index of refraction. The secondary lens has a predetermined radius of curvature on its convex front and back surfaces. The secondary lens 14 has a predetermined thickness at its vertex and predetermined aperture sizes on the convex front and back surfaces.

The tertiary lens 16 is centered with respect to the optical axis 26. Generally the tertiary lens is formed from a material providing a high index of refraction. The tertiary lens 16 has a predetermined radius of curvature on its front and back surfaces. The tertiary lens 16 has a predetermined thickness at its vertex and predetermined aperture sizes on its convex front and back surfaces.

The quartenary lens 18 is centered with respect to the optical axis 26. Generally, the quartenary lens 18 is a biconcave lens formed from a material providing a high index of refraction. Generally the quartenary lens has a predetermined radius of curvature on its concave front and back surfaces. The quartenary lens 18 has a predetermined thickness at its vertex and predetermined aperture sizes on its concave front and back surfaces. Generally, the tertiary 16 and quartenary 18 lenses are adhered together by conventional means to form a doublet.

The quinary lens 20 is centered with respect to the optical axis 26. Generally, the quinary lens 20 is a biconvex lens formed from a material providing a high index of refraction. The quinary lens 20 has a predetermined radius of curvature on its convex front and back surfaces. The quinary lens 20 also has a predetermined thickness at its vertex and predetermined aperture sizes on its convex front and back surfaces.

The sextary lens 22 is centered with respect to the optical axis 26. Generally, the sextary lens 22 is a convex/planar lens formed from a material providing a high index of refraction. The sextary lens 22 has a predetermined radius of curvature on its convex or front surface. The sextary lens 22 has a predetermined thickness at its vertex and predetermined aperture sizes on its convex front and planar back surfaces.

The effective focal length of each six lens system is of a predetermined length of about 1.46 inches. The distance 30 from the exit pupil, or viewer's eye, to the sextary lens 22 is of a predetermined distance of about 2.5 inches which provides a long eye relief distance for the viewer. Thus, the ratio of the focal length to the eye relief distance is 1.71 inches. The exit pupil diameter is about 0.315 inch. The selected lens glass combination enhances correction of primary and secondary axial aberration over the entire exit pupil. Spherical aberration is likewise corrected over the entire exit pupil. The system further minimizes coma and lateral chromatic aberration. Further, distortion is less than about 3.7% as illustrated in FIG. 3. The circular field of view coverage of the eyepiece is about 37.6°. The spectral band of correction is the visible band from about 0.4861 μm to 0.6563 μm.

A specific prescription for a six lens optical system is given in the following table.

TABLE 1

| Optical Characteristics Of The Binocular Eyepiece | |
|---|---|
| OPTICAL CHARACTERISTICS | VALUE |
| Field of View, degrees | 37.6 |
| Effective Focal Length, inches (mm) | 1.460 (37.1) |
| Exit Pupil Diameter, inches (mm) | 0.315 (8.0) |
| F-number | F/4.64 |
| Distortion, percent | <3.7 |
| Gaussian Image Height, inches | 0.497 (semi-height) |
| Spectral Band, μm | 0.4861 to 0.6563 |
| Maximum Lens Diameter, inches | 1.9 |

TABLE 2

Optical Prescription Of The Binocular Eyepiece

Basic Lens Data

| SURF | RD | TH | MEDIUM | RN | DF | VNUM |
|---|---|---|---|---|---|---|
| 0 | 0.000000E + 00 | 0.500547 | AIR | | | |
| 1 | −0.849120 | 0.300000 | SCHOTT SF11 | 1.791896 | 1.009 | 25.98 |
| 2 | −1.06894 | 0.220282E − 01 | AIR | | | |
| 3 | 9.31289 | 0.500000 | SCHOTT LAK10 | 1.723398 | 0.057 | 50.62 |
| 4 | −1.75958 | 0.220282E − 01 | AIR | | | |
| 5 | −26.4100 | 0.500000 | SCHOTT LAK9 | 1.694011 | −0.009 | 54.92 |
| 6 | −1.87409 | 0.135000 | SCHOTT SF11 | 1.791896 | 1.009 | 25.98 |
| 7 | 2.31396 | 0.881128E − 01 | AIR | | | |
| 8 | 3.38743 | 0.400000 | SCHOTT LAK10 | 1.723398 | 0.057 | 50.62 |
| 9 | −4.43473 | 0.550705E − 01 | AIR | | | |
| 10 | 2.46938 | 0.300000 | SCHOTT LAK10 | 1.723398 | 0.057 | 50.62 |
| 11 | 0.000000E + 00 | 2.50000 | AIR | | | |
| 12 | 0.000000E + 00 | 0.000000E + 00 | AIR | | | |
| 13 | 0.000000E + 00 | | | | | |

Refractive Indices

| SURF | N1 | N2 | N3 | N4 | N5 |
|---|---|---|---|---|---|
| 1 | 1.791896 | 1.806464 | 1.775983 | 1.000000 | 1.000000 |
| 3 | 1.723398 | 1.729968 | 1.715679 | 1.000000 | 1.000000 |
| 5 | 1.694011 | 1.699797 | 1.687162 | 1.000000 | 1.000000 |
| 6 | 1.791896 | 1.806464 | 1.775983 | 1.000000 | 1.000000 |
| 8 | 1.723398 | 1.729968 | 1.715679 | 1.000000 | 1.000000 |
| 10 | 1.723398 | 1.729968 | 1.715679 | 1.000000 | 1.000000 |

Clear Aperatures And Obstructions

| SURF | TYPE | CAY | CAX | YDEC | XDEC | TILT |
|---|---|---|---|---|---|---|
| 1 | CIRC | 0.63000 | | | | |
| 2 | CIRC | 0.82606 | | | | |
| 3 | CIRC | 0.95000 | | | | |
| 4 | CIRC | 0.95000 | | | | |

TABLE 2-continued

Optical Prescription Of The Binocular Eyepiece

| 5  | CIRC | 0.95000 |
| 6  | CIRC | 0.95000 |
| 7  | CIRC | 0.95000 |
| 8  | CIRC | 0.95000 |
| 9  | CIRC | 0.95000 |
| 10 | CIRC | 0.95000 |
| 11 | CIRC | 0.95000 |
| 12 | CIRC | 0.15748 |

| REF OBJ Y-HT | REF AP Y-HT | OBJ SURF | REF SURF | IMG SURF | EVL SURF |
|---|---|---|---|---|---|
| −0.479500 (−17.31 DG) | 0.15748 | 0 | 12 | 13 | 13 |

| ER | EPR | A-MAG | LENGTH |
|---|---|---|---|
| −.67604419E − 15 | 0.15808035 | −1.0541930 | 2.3222397 |

APERATURE STOP AT SURF 12
EVALUATION MODE IS FOCAL
PRIMARY CHROMATIC WAVELENGTHS ARE 2–3
SECONDARY CHROMATIC WAVELENGTHS ARE 2–1

| WAVL NBR | 1 | 2 | 3 | 4 | 5 |
|---|---|---|---|---|---|
| WAVELENGTH | 0.54610 | 0.48610 | 0.65630 | 0.00000 | 0.00000 |
| SPECTRAL WT | 1.0000 | 0.5000 | 0.5000 | 0.0000 | 0.0000 |

[(+) thicknesses are to the right; (+) radii have centers to the right; (+) decenters are up; (+) tilts are counterclockwise; decenters done before tilts]

It should be noted that the above prescription is an example for illustrated purposes and should not be construed in any way to limit the present invention.

Figure 4:
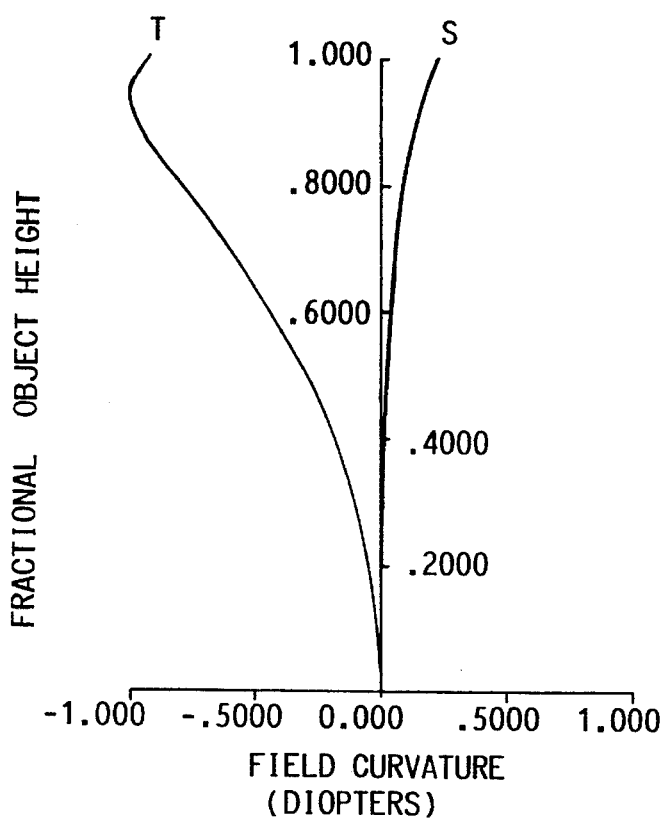
FIG. 4 is a graph of field curvature of the present invention.

FIGS. 2a and 2b show the H-tanU curves of the optical system shown in FIG. 1. H-tanU curves have been used by skilled optical designers to describe the geometric aberration of an optical system. Those curves on the right and left hand sides correspond to the tangential and sagittal geometrical aberrations, respectively. The top, middle and bottom curves are the geometric aberration at full field, 70% field and on axis, respectively. The curves 1, 2 and 3 in each H-tanU plot are the geometric aberrations for the wavelengths 0.5461 μm, 0.4861 μm and 0.6563 μm, respectively. The wider the spread among the three colors, the worse the chromatic aberration. The H-tanU curves in FIGS. 2a and 2b show the primary and secondary axial chromatic aberrations are extremely well corrected. The sagittal field curvature is well controlled as well as coma. The residual aberrations are tangential field curvature (~1.0 diopters) and lateral chromatic aberration of 1.25 milliradians, as seen in FIG. 4. Distortion is less than 3.7%, as seen in FIG. 3.

Advantages shown by the examples of the preferred embodiment is the 80% increase in eye relief distance over conventional eyepiece designs. The invention provides correction of the exit pupil over an 8 mm diameter. The present invention is well corrected for lateral chromatic aberration and distortion. Also, the present invention includes high index of refraction glass type lenses which combine together to provide a small Petzval curvature sum and a relatively flat field design. Also, the system provides excellent primary and secondary axial chromatic aberration over the entire exit pupil. The spherical aberration is well corrected over the exit pupil.

The binocular eyepiece has application in the ITAS (Improved Target Acquisition System) visible optical system used in ground TOW vehicle applications. The binocular eyepiece may also be used in helicopters, tanks, or Bradley vehicle visible sight systems. The invention enables the user to wear a protective mask while still being able to view the scene through the binocular eyepiece.

While it will be apparent that the preferred embodiment is well calculated to fill the above stated objectives, it will also be appreciated that the present invention is susceptible to modifications, alterations, variations and changes without varying from the proper scope and fair meaning of the subjoined claims.

What is claimed is:

1. A binocular eyepiece comprising:
    a pair of optical systems, each system consisting of six lenses, one lens defining an optical axis and the remaining five lenses centered on said axis, said lenses collimating said energy to an exit pupil positioned a desired distance away from the last lens providing extended eye relief, wherein said six lenses of each system are negative, positive, positive, negative, positive and positive power lenses.

2. The binocular eyepiece according to claim 1, wherein said eye relief distance from the last lens to the exit pupil is about 2.5 inches.

3. The binocular eyepiece according to claim 1, wherein two of said six lenses are connected together to form a doublet.

4. The binocular eyepiece according to claim 1, wherein at least two of the lenses have negative power.

5. The binocular eyepiece according to claim 1, wherein all of said lenses have spherical surfaces.

6. The binocular eyepiece according to claim 1, wherein all of said lenses are of high index of refraction glass.

7. The binocular eyepiece according to claim 6, wherein said systems have a small Petzval curvature sum and a substantially flat field.

8. A binocular eyepiece comprising:
    a pair of primary lenses, said primary lenses being negative concave/convex lenses defining optical axes, said primary lenses positioned to receive energy from an objective element;
    a pair of secondary lenses, said secondary lenses being positive biconvex lenses disposed adjacent said pair of primary lenses and centered with respect to the optical axes;

a pair of tertiary lenses, said tertiary lenses being positive biconvex lenses disposed adjacent said secondary lenses and centered with respect to the optical axes;

a pair of quartenary lenses, said quartenary lenses being negative biconcave lenses disposed adjacent said tertiary lenses and centered with respect to the optical lenses;

a pair of quinary lenses, said quinary lenses being positive biconvex lenses disposed adjacent said quartenary lenses and centered with respect to the optical axes; and a pair of sextary lenses, said sextary lenses being positive convex/planar lenses disposed adjacent said quinary lenses and centered with respect to the optical axes, said pairs of lenses collimating said energy to an exit pupil positioned a desired distance away from said sextary lenses providing a desired eye relief distance.

9. The binocular eyepiece according to claim 8, wherein said eye relief distance from the sextary lens to the exit pupil is about 2.5 inches.

10. The binocular eyepiece according to claim 8, wherein said tertiary and quartenary lenses form a doublet.

11. The binocular eyepiece according to claim 8, wherein said exit pupil has a diameter of about 0.315 inch.

12. The binocular eyepiece according to claim 1, wherein each optical system provides a ratio of focal length to eye relief distance of about 1:1.71.

* * * * *